United States Patent
Lin

(10) Patent No.: US 8,327,701 B2
(45) Date of Patent: Dec. 11, 2012

(54) IMPELLER ASSEMBLY MOUNTING STRUCTURE OF VANE ANEMOMETER

(76) Inventor: Dong-Chang Lin, Taipei (TW)

( * ) Notice: Subject to any disclaimer, the term of this patent is extended or adjusted under 35 U.S.C. 154(b) by 326 days.

(21) Appl. No.: 12/869,751

(22) Filed: Aug. 27, 2010

(65) Prior Publication Data

US 2012/0048010 A1     Mar. 1, 2012

(51) Int. Cl.
*G01W 1/00*     (2006.01)
(52) U.S. Cl. .................. 73/170.11; 73/170.01
(58) Field of Classification Search .......... None
See application file for complete search history.

(56) References Cited

U.S. PATENT DOCUMENTS

| | | | | |
|---|---|---|---|---|
| 5,710,380 A | * | 1/1998 | Talley et al. ............... | 73/861.85 |
| 5,783,753 A | * | 7/1998 | Kellerman .................. | 73/861.94 |
| 5,939,645 A | * | 8/1999 | Kellerman .................. | 73/861.94 |
| 6,257,074 B1 | * | 7/2001 | Kellerman .................. | 73/861.94 |
| 7,452,127 B2 | * | 11/2008 | Blakely, III .................. | 374/142 |
| 7,637,172 B2 | * | 12/2009 | Yu et al. ..................... | 73/861.65 |

\* cited by examiner

*Primary Examiner* — Lisa Caputo
*Assistant Examiner* — Jermaine Jenkins
(74) *Attorney, Agent, or Firm* — Leong C. Lei

(57) ABSTRACT

A vane anemometer includes an anemometer body forming a receiving chamber that has a side wall forming retention slots for receiving and retaining therein an impeller assembly. The impeller assembly includes an upper cage forming retention tabs and coupling slots, a lower case forming coupling tabs and notches, and an impeller set rotatably supported between the upper cage and the lower case. Each coupling tab of the lower case forms a coupling pawl engageable with each coupling slot of the upper cage to couple the upper cage and the lower case together. The retention tabs of the upper cage are received in the notches of the lower case and each includes a retention nub, whereby the retention tabs form engagement with the retention slots of the receiving chamber of the anemometer body to easily mount the impeller assembly to the anemometer body in a secure manner.

5 Claims, 5 Drawing Sheets

IMPELLER ASSEMBLY MOUNTING STRUCTURE OF VANE ANEMOMETER

TECHNICAL FIELD OF THE INVENTION

The present invention generally relates to a structure for mounting an impeller assembly that receives and is acted upon and rotated by airflow in a vane anemometer for detecting the speed of the airflow.

DESCRIPTION OF THE PRIOR ART

A known vane anemometer has a construction similar to what is shown in for example U.S. Pat. Nos. 5,783,753, 5,939,645, and 6,257,74B1. All of these known vane anemometers show feature of mounting an impeller assembly. In this respect, these known devices look very similar, but they also possess individual unique and different structures. One of the reasons that these known devices look similar is that the basic structure of the vane anemometer is simple, which easily leads to confusion of similarity. However, it is noted that all these known devices show different structures for mounting the impeller assembly. Due to the same reason, the present invention, which relates to a structure for mounting an impeller assembly in a vane anemometer, is similar to some extents to the known devices, yet it is appreciated that the structure of the present invention is indeed different from the known structures. Further details of the impeller mounting structure according to the present invention will be given hereinafter, and with such details, the difference of the present invention from the known structures will be easily recognized.

SUMMARY OF THE INVENTION

The present invention provides a structure for mounting an impeller assembly in a vane anemometer, which, although looking similar to the known structures, improves the complicated mounting structure employed in the known vane anemometers. Thus, the present invention provides an improvement on the impeller assembly mounting structure for a vane anemometer.

According to the present invention, an impeller mounting structure of vane anemometer is provided, comprising an anemometer body, which forms a receiving chamber that has a side wall forming retention slots for receiving and retaining therein an impeller assembly. The impeller assembly comprises an upper cage, a lower case, and an impeller set that has a shaft. The upper cage forms retention tabs at two opposite locations and also forms coupling slots in an outside surface thereof at three symmetric locations. The lower case forms coupling tabs, each of which forms a coupling pawl, at three symmetric locations and also forms notches in a side wall thereof at two opposite locations. The side wall of the lower case has an outside surface forming positioning projections at locations below the notches. With such an arrangement, the impeller assembly can be easily mounted to the anemometer body in a secure manner, so that time and effort required for assembling can be reduced and manufacturing costs lowered down.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
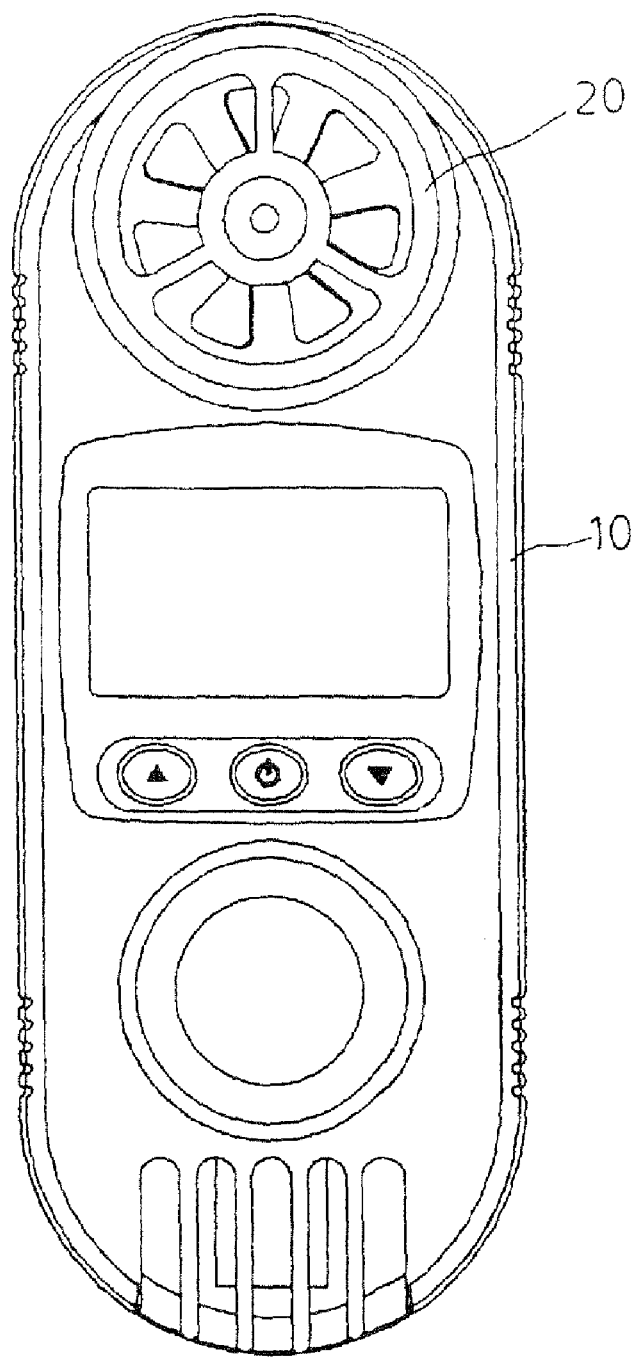
FIG. 1 is a plan view of a vane anemometer according to the present invention.
Figure 2:
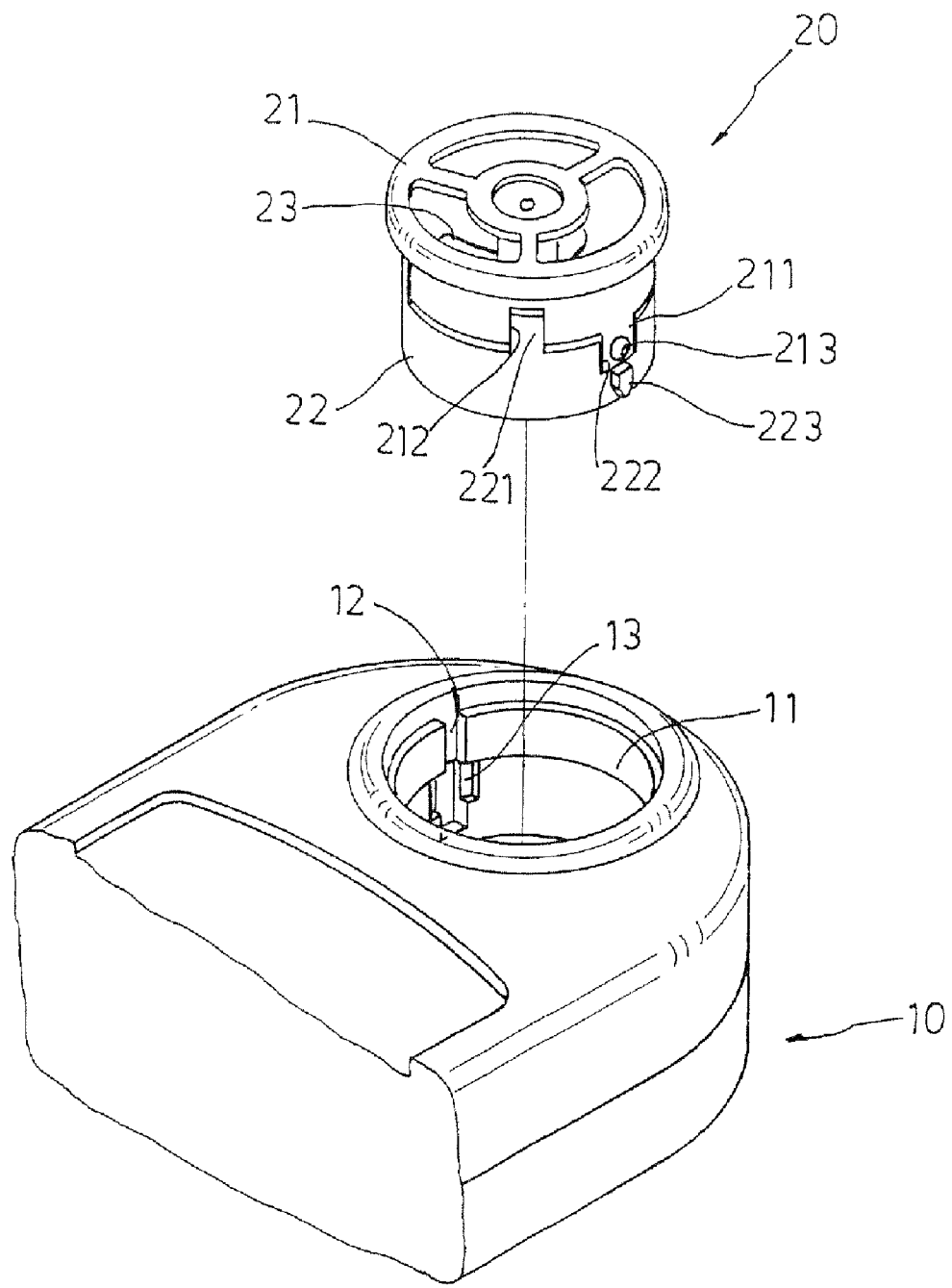
FIG. 2 is an exploded view of a portion of the vane anemometer according to the present invention, wherein an impeller assembly is detached from an anemometer body of the vane anemometer.
Figure 3:
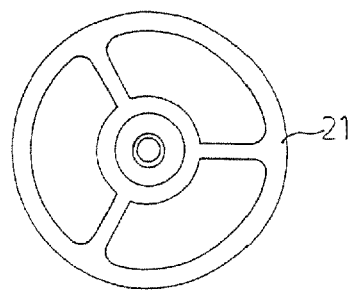
FIG. 3 is a top plan view of an upper cage of the impeller assembly of the vane anemometer according to the present invention.
Figure 4:
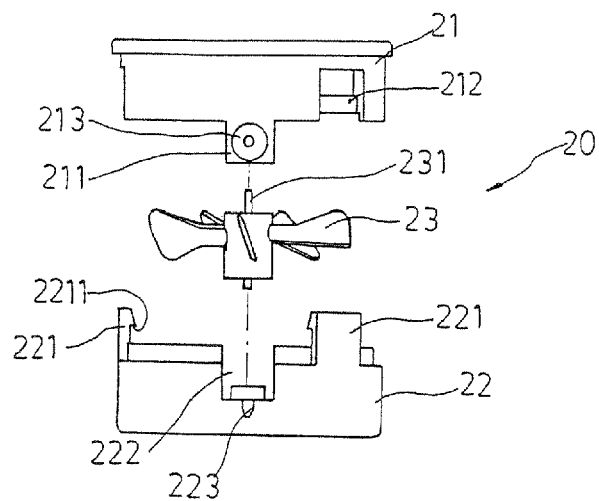
FIG. 4 is a front view of the impeller assembly according to the present invention in an exploded form.
Figure 5:
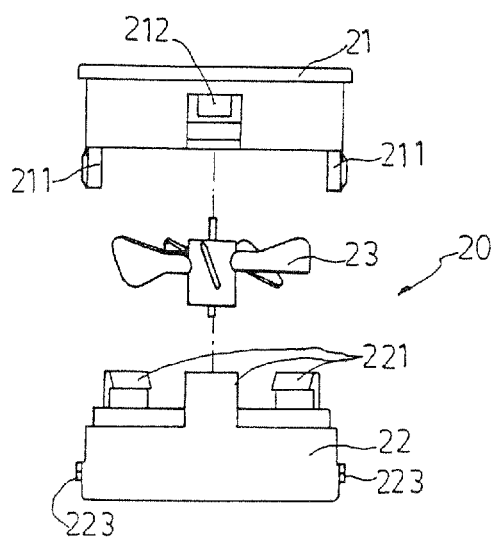
FIG. 5 is a left side elevational view of the impeller assembly according to the present invention in an exploded form.
Figure 6:
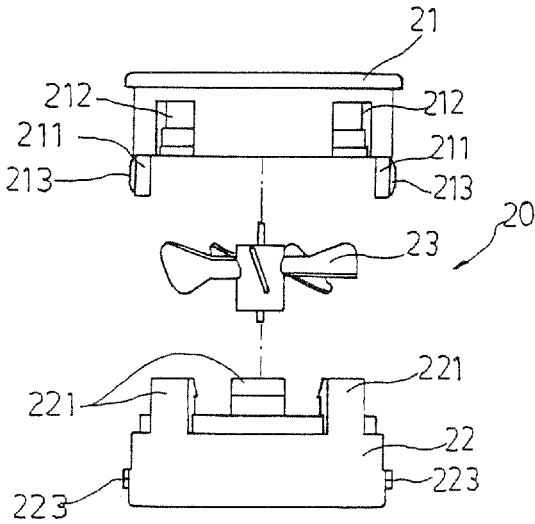
FIG. 6 is a right side elevational view of the impeller assembly according to the present invention in an exploded form.
Figure 7:
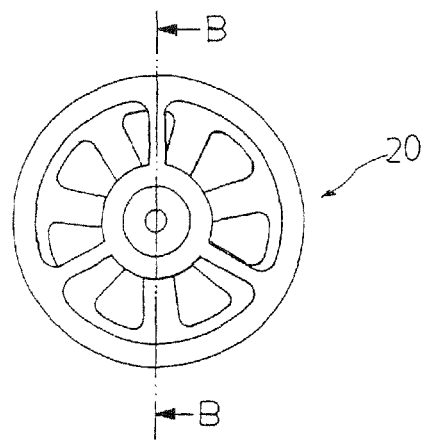
FIG. 7 is a top plan view of the impeller assembly according to the present invention in an assembled form.
Figure 8:
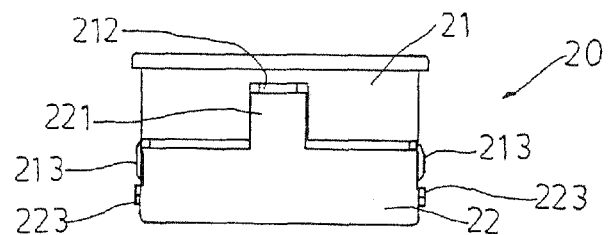
FIG. 8 is a side elevational view of the impeller assembly according to the present invention in an assembled form.
Figure 9:
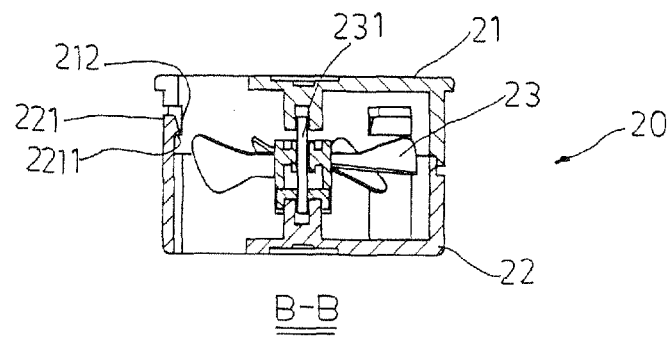
FIG. 9 is a cross-sectional view of the impeller assembly according to the present invention in an assembled form.
Figure 11:
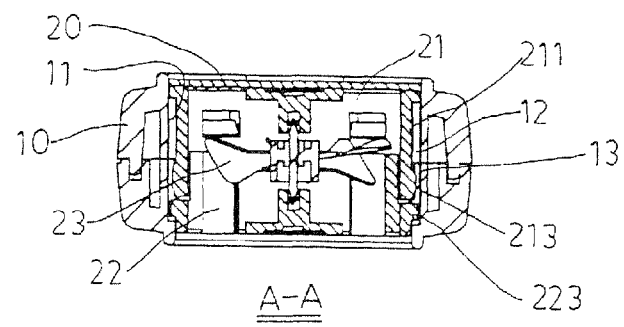
FIG. 11 is a cross-sectional view showing the vane anemometer according to the present invention in a completely assembled form.
Figure 10:
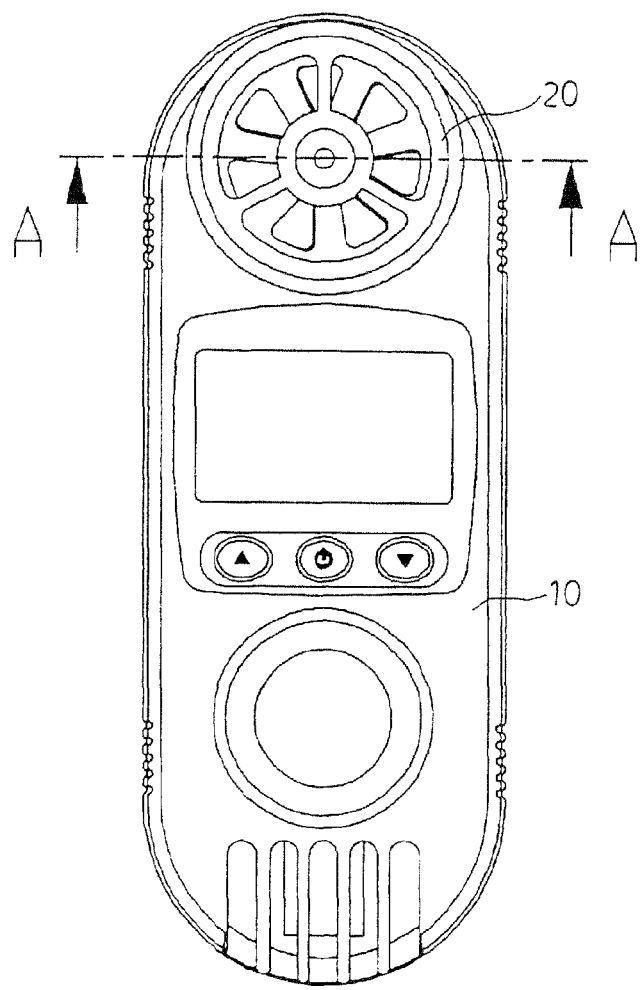
FIG. 10 is a plan view showing the vane anemometer according to the present invention in a completely assembled form.

As shown in FIGS. 1 and 2, the present invention provides a vane anemometer, which comprises an anemometer body 10. The anemometer body 10 forms a receiving chamber 11 that is delimited by a circumferential side wall in which two positioning slots 12 that are opposite to each other are defined. A deeply recessed and width-enlarged retention slot 13 is defined in the sidewall at a location below each of the positioning slots 12 for retaining an impeller assembly 20 that is received into the receiving chamber 11 through the positioning slots 12. As shown in FIGS. 2-9, the impeller assembly 20 comprises an upper cage 21, a lower case 22, and an impeller set 23 carrying a shaft 231. The upper cage 21 forms two opposite retention tabs 211 each of which forms a retention nub 213. Further, the upper cage 21 has an outer surface forming three coupling slots 212 in a symmetric arrangement. The lower case 22 forms three coupling tabs 221, each of which forms a coupling pawl 2211, corresponding to the coupling slots 212. Further, the lower case 22 has a side wall forming two notches 222 and having an outside surface on which two positioning projections 223 are formed respectively below the notches 222. The impeller set 23 of the impeller assembly 20 is supported in a rotatable manner by the shaft 231 between the upper cage 21 and the lower case 22. To couple the upper cage 21 and the lower case 22 together, the coupling tabs 221 of the lower case 22 are respectively fit into the coupling slots 212 of the upper cage 21 with the coupling pawls 2211 securely engaging the coupling slots 212. The retention tabs 211 of the upper cage 21 are received in the notches 222 of the lower case 22 to form an arrangement of resiliency and elastic deformability. The impeller assembly 20 so assembled may then be mounted to the anemometer body 10, wherein the positioning projections 223 formed below the notches 222 of the lower case 22 are received in and guided by the positioning slots 12 of the receiving chamber 11 to smoothly set the impeller assembly 20 into the receiving chamber 11. The arrangement of resiliency and elastic deformability allows the retention nubs 213 of the retention tabs 211 of the upper cage 21 of the impeller assembly 20 to easily establish coupling engagement with the retention slot s 13 of the receiving chamber 11 of the anemometer body 10. In this way, the impeller assembly 20 can be easily and securely mounted to the anemometer body 10 and the time and effort required for the mounting operation are reduced so as to lower down the manufacturing costs.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A vane anemometer comprising an anemometer body, which forms a receiving chamber that has a side wall forming retention slots for receiving and retaining therein an impeller assembly, the impeller assembly comprising an upper cage that forms retention tabs and coupling slots, a lower case that forms coupling tabs and notches, and an impeller set rotatably supported between the upper cage and the lower case, each of the coupling tabs of the lower case forming a coupling pawl that is engageable with each of the coupling slots of the upper cage to couple the upper cage and the lower case together, the retention tabs of the upper cage being received in the notches of the lower case and each comprising a retention nub, whereby the retention tabs form engagement with the retention slots of the receiving chamber of the anemometer body to easily mount the impeller assembly to the anemometer body in a secure manner.

2. The vane anemometer according to claim 1, wherein the retention tabs are formed on the upper cage at two opposite locations and the coupling slots are formed in an outside surface of the upper cage at three symmetric locations.

3. The vane anemometer according to claim 1, wherein the coupling tabs are formed on the lower case at three symmetric locations and the notches are formed in a side wall of the lower case at two opposite locations, each of the notches comprising each of the positioning projections formed on an outside surface of the side wall at a location below the notch.

4. The vane anemometer according to claim 1, wherein the side wall of the receiving chamber forms two opposite positioning slots, each of the retention slots being formed in the side wall below each of the positioning slots and being deeply recessed and with enlarged with respect to the positioning slot.

5. The vane anemometer according to claim 1, wherein the impeller set comprises a shaft that rotatably supports the impeller set between the upper cage and the lower case.

\* \* \* \* \*